United States Patent
Siracusa

(10) Patent No.: US 6,295,707 B1
(45) Date of Patent: Oct. 2, 2001

(54) PORTABLE BORING—WELDING MACHINE WITH SIMPLIFIED DRIVE

(75) Inventor: Rinaldo Siracusa, Catanzaro (IT)

(73) Assignee: Sir Meccanica S.r.l. (IT)

( * ) Notice: Subject to any disclaimer, the term of this patent is extended or adjusted under 35 U.S.C. 154(b) by 0 days.

(21) Appl. No.: 09/371,206

(22) Filed: Aug. 10, 1999

(30) Foreign Application Priority Data

Aug. 12, 1998 (IT) ............................................. BO98U0094

(51) Int. Cl.[7] ............................... B23Q 5/04; B23B 39/28
(52) U.S. Cl. ........................... 29/26 A; 29/560; 228/48; 408/238; 409/231
(58) Field of Search .................................. 29/26 A, 26 R, 29/560; 408/138, 238, 22, 24; 409/231, 175; 219/76.14; 228/48

(56) References Cited

U.S. PATENT DOCUMENTS

| | | |
|---|---|---|
| 2,820,420 | 1/1958 | Hayes . |
| 4,550,235 * | 10/1985 | Füwesi ............................ 219/76.14 |
| 4,873,419 * | 10/1989 | Acheson ........................... 219/125.1 |
| 4,932,427 * | 6/1990 | McVicker ......................... 219/125.11 |
| 5,350,259 * | 9/1994 | Russo ................................ 408/138 X |
| 6,073,322 * | 6/2000 | Russo ................................... 29/26 A |

FOREIGN PATENT DOCUMENTS

| | | |
|---|---|---|
| 58-179564 | 10/1983 | (JP) . |
| SU-A-173111 | 12/1964 | (SU) . |

* cited by examiner

*Primary Examiner*—William Briggs
(74) *Attorney, Agent, or Firm*—Fay Sharpe Fagan Minnich & McKee, LLP

(57) ABSTRACT

A portable boring-welding machine, in which the rotation of the tool shaft or the torch shaft and, respectively, the axial movement of the tool shaft or torch shaft in both directions are driven by a combination of only two independent motors, which can be activated from the machine control unit. The motors are housed in a box which is integral with the machine structure and has a machine carry-handle. At least the motor which drives the rotation of the tool and torch shafts is of the direct current type and is subject to the action of means which adjust its speed and operating stroke, said means being positioned, respectively, on the control unit control panel and at end of stroke means, intercepted by actuators which follow the axial movement of the tool and torch shafts.

5 Claims, 2 Drawing Sheets

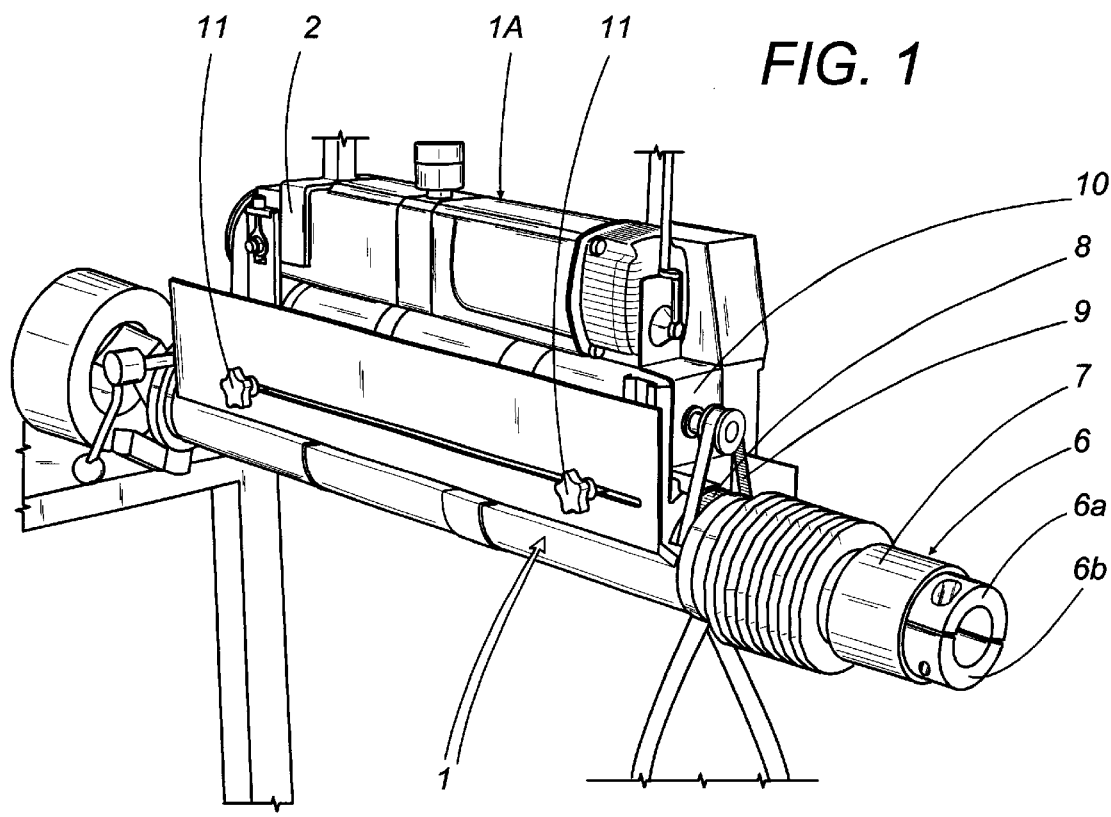
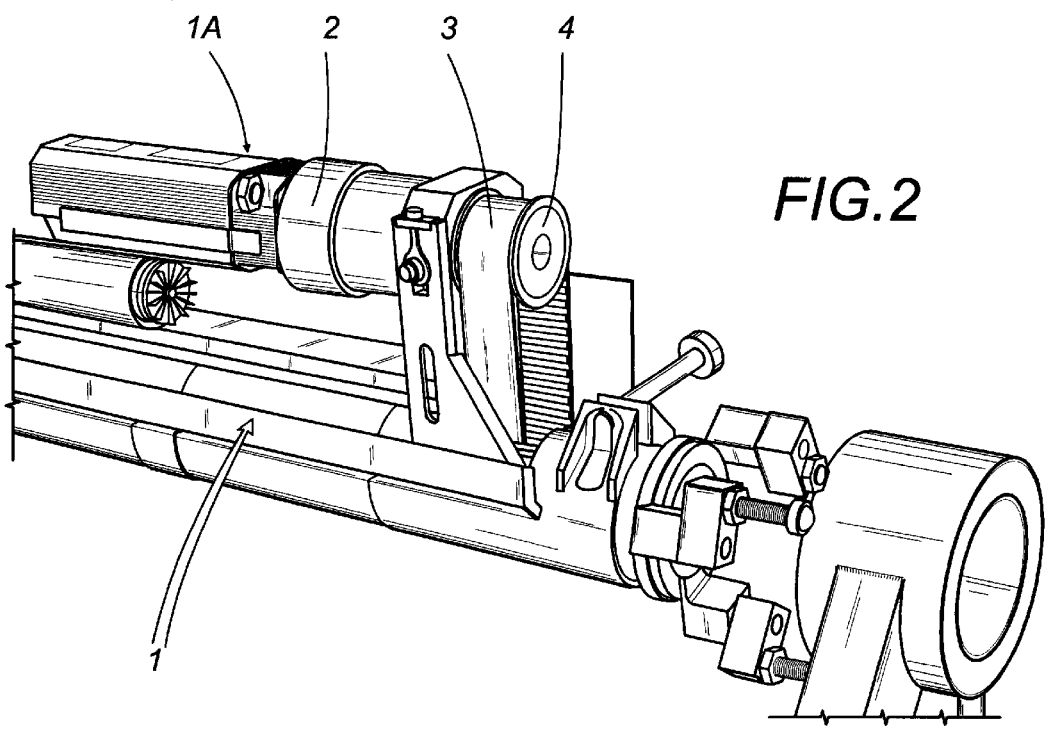

PORTABLE BORING— WELDING MACHINE WITH SIMPLIFIED DRIVE

BACKGROUND OF THE INVENTION

The present invention relates to a portable boring—welding machine, of the type used to restore the original dimensions of holes or seats for knuckle pins, rotation bushings, etc., on machines or machine parts, without having to transport the part to be machined to the workshop and without positioning the part on machine tools.

Machines of this type are already known on the market. The Applicant has, for many years, manufactured and sold a boring machine, marketed with the "bimotor plus" trademark, in which the tool axle/shaft and the torch axle/shaft are driven by two different motors or drive units, specifically dedicated to driving one (at high speed) and the other (at low speed). The two motors, or drive units, are connected, with different timing, to a unit which transmits the motion to the shafts. Said unit is supported inside the self-supporting machine structure. A third motor, or drive unit, is envisaged for obtaining an axial movement of the tool and torch axles/shafts.

In the known machines, the three drive units, as described above, are housed in a box-shaped part of the machine, connected to the self-supporting structure. This box is shaped in such a way that it has, or may be fitted with, a handle for manual transportation of the machine.

The use of three motors and the relative transmissions means that the dimensions of the above-mentioned box are significant and the machine heavy. Since it must be transported manually, it should, instead, be functional and at the same time very light.

SUMMARY OF THE INVENTION

The aim of the present invention is to provide a boring machine of the above-mentioned type, in which the rotation of the tool or torch shafts and, respectively, the axial movement in either direction, of said shafts, are powered by only two independent motors, in combination. The two motors can be activated from the machine control unit and are both housed in the same machine box with a carry-handle. At least the motor designed to rotate the tool and torch shafts is a direct current motor and is subject to the action of means which adjust its speed and stroke, respectively positioned on the control panel of the control unit and at end of stroke means which can be intercepted by actuators which follow the axial movement of the tool and torch shafts.

Experiments have indicated that this motor combination provides optimum adjustment of the speed of the tool and torch axles/shafts, with a small reduction in the number of transmission means until now necessary for the above-mentioned drive and, advantageously, a reduction in the overall weight of the machine. In addition, machine assembly is facilitated and the machine is, overall, economical to make, thanks to its simplified operating shaft drive system.

BRIEF DESCRIPTION OF THE DRAWINGS

The technical features of the present invention are more clearly described in the detailed description of the machine below, with reference to the accompanying drawings, which illustrate an embodiment of the invention, without limiting the scope of its application, and in which:

FIG. 1 is a perspective rear view of the machine according to the present invention, without the drive means box cover;

FIG. 2 is a perspective front side view of the machine disclosed, temporarily mounted on a support and in the same conditions as illustrated in FIG. 1;

DESCRIPTION OF THE PREFERRED EMBODIMENTS

Figure 3:
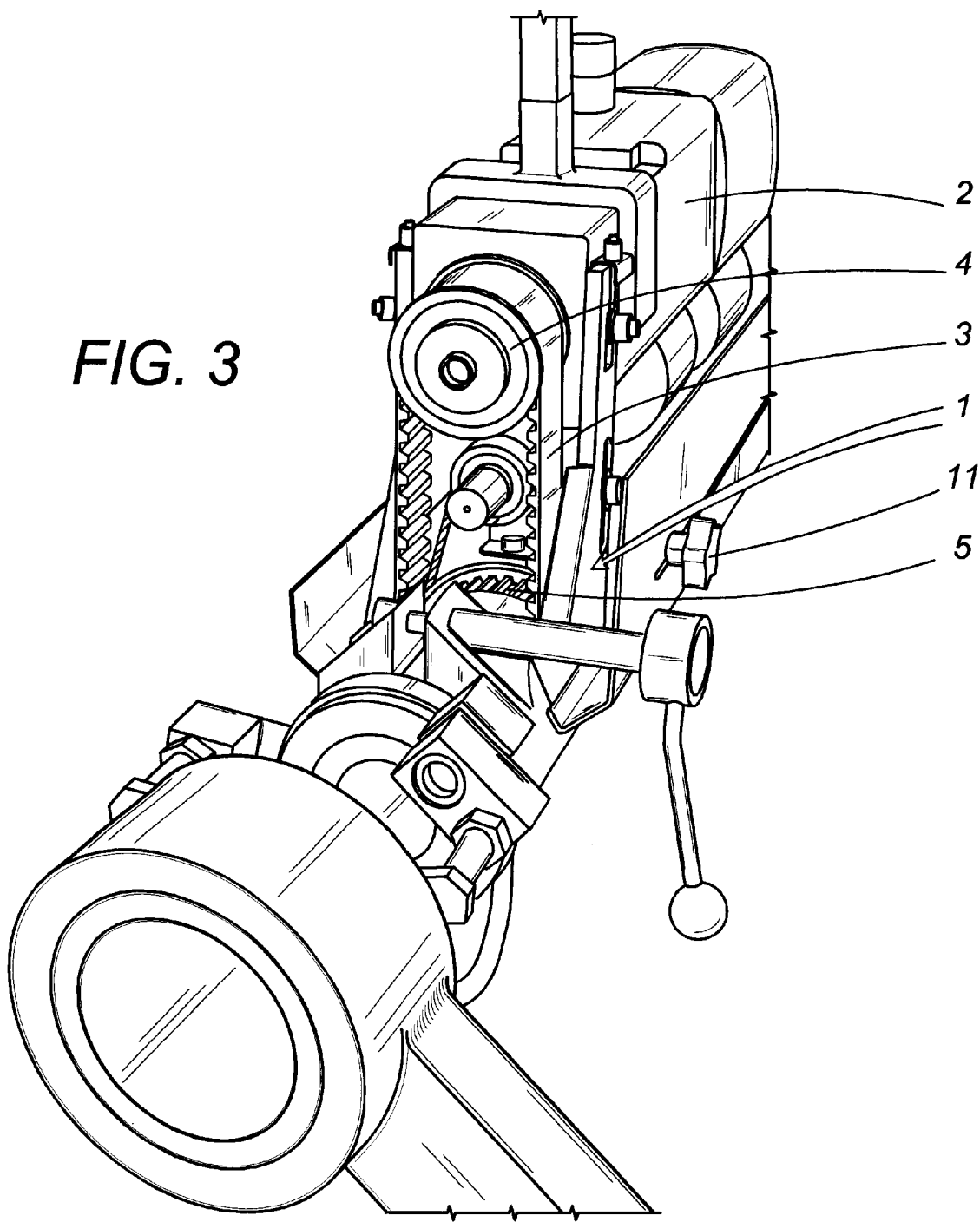
FIG. 3 is another front side view of the machine disclosed, in the same conditions as in FIG. 2.

The machine disclosed is of the type comprising a structure 1 which houses support parts such as bushings, bearings, etc. which allow the rotation (and simultaneous forward/backward movement) of a shaft (not illustrated in the accompanying drawings) which longitudinally passes through the entire body of the machine, exiting at least from the front of the machine, by a length sufficient to bring one or more boring tools, or a welding torch, to the operating position. The rotation and forward/backward movement of the shaft allow said boring tools and welding torch to operate inside holes (through-holes and blind holes) in a part to be machined and to which the machine can be fixed.

The boring machine disclosed can be used for boring operations and, respectively, to apply material, in order to restore the original conditions of the seats (through- or blind holes) worn by use. The holes or seats normally house and support knuckle pins or axles of machine tool elements, for example, earth-moving machinery, or pins or axles of machines or equipment subject to significant stresses which, over time, make the support seats oval, creating unwanted play which must be eliminated.

If boring operations must be carried out, the shaft which runs longitudinally through the entire body of the machine has at least one longitudinal groove for torsional attachment of the shaft to the means on the machine which drive its rotation. Said means, in the boring machine disclosed, are housed in the front part of the machine and, in accordance with the present invention, are driven by a first drive unit 2, to which they are kinematically connected by a toothed belt 3 which is partially wound around a toothed pulley 4 keyed to the axle of the drive unit 2, and partially wound around the toothed sleeve of a bushing 5 (illustrated in FIG. 3) inside which the above-mentioned shaft translates thanks to its torsional engagement with the bushing, thus being rotated by the latter.

At regular intervals along its length and at least on the part projecting from the front of the machine, the shaft has seats which can house and support the shank of boring tools, which can be positioned in them and adjusted so that they project radially from the shaft, using known techniques which are not, therefore, described.

If material must be applied in the seat, the shaft which runs longitudinally through the entire body of the machine again has at least one longitudinal groove for torsional attachment of the shaft to the means on the machine which drive its rotation, said means being those driven by the drive unit 2. In this case, there is a longitudinal through-hole in the shaft, through which one or more cables and/or power leads of a welding torch can be passed, said torch being fixed to the front of the shaft.

In both cases, the shaft which passes through the entire body of the machine can be moved axially by means of a joint 6 at the rear of the machine. The joint 6 comprises a pair of jaws 6a–6b, which move towards and/or away from one another, and which can be clamped together about the outer sleeve of the tool shaft or torch shaft. The jaws 6a–6b are supported by a bushing 7, mounted on a tubular bar, the outside of which is threaded, which in turn engages with another bushing 8, the inside of which is threaded, supported by the machine body at the rear (shown in FIG. 1).

The bushing 8 is kinematically connected, by a toothed belt 9, to the second machine drive unit 10 (see FIG. 1) so that the rotation of the bushing 8 corresponds with an axial movement of the threaded bar and, as a result, of the bushing 7 to which the jaws 6a–6b are connected.

The bushing 7 is connected to the threaded bar by bearings (not visible in the accompanying drawings), which allow it to rotate relative to the bar without the possibility of a relative axial movement. As a result, with the jaws 6a–6b clamped on the tool shaft or the torch shaft, the bushing 7 can rotate with the shafts rotated by the first drive unit 2, there remaining the possibility that the threaded bar may be moved forward/backward axially to the machine by the second drive unit 10, moving said tool shaft and/or torch shaft forward/backward.

At least the first drive unit 2 is of the direct current type and allows optimum adjustment of the speed of rotation of the tool shaft and, respectively, the torch shaft, without requiring special reduction gear units, as occurs in the prior art.

As is clearly illustrated in the accompanying drawings, the two drive units 2 and 10 are housed in a box-shaped part 1A of the machine. This part 1A is designed so that it is closed with a cover (not illustrated in the accompanying drawings) fitted with a machine carry-handle.

In the same area in which the cover is positioned, as is known, the machine also has one or more support rods for the machine electrical control unit. The electrical circuits and relative potentiometers, relays, switches, etc. for the control of the two drive units 2 and 10 are connected to the control unit.

One side of the machine (see FIG. 1) may be fitted with end of stroke devices 11, with adjustable position, which can be intercepted by actuators able to follow the axial translation of the tool or torch shafts and inserted in the electrical control circuit of at least the drive unit 10 and able to stop said drive unit when the shafts have completed their working stoke.

The present invention may be subject to numerous variations, all encompassed by the original design concept. Moreover, all parts may be substituted with technically equivalent elements.

What is claimed is:

1. A portable boring and welding machine comprising:

a support structure adapted for operatively supporting an associated shaft for rotation and reciprocal axial movement relative to said support structure, said associated shaft holding one of an associated cutting tool and an associated torch;

a drive system for simultaneously rotating and axially reciprocating said associated shaft relative to said support structure, said drive system limited to two separate independent drive motors including: (i) a first, direct-current electrical drive motor connected to said support structure and adapted for operative coupling to said associated shaft to rotate said associated shaft relative to said support structure; and, (ii) a second electric motor connected to said support structure and adapted for operative coupling to said associated shaft to axially reciprocate said associated shaft while said first drive motor rotates said associated shaft; and a joint used for axial movement of the associated shaft, said joint comprising a pair of jaws adapted for placement about an outer sleeve of the associated shaft, said jaws supported by a first bushing mounted on a tubular bar, the exterior of said bar being threaded and engaging with a second bushing, said second bushing having a threaded interior and supported by said support structure, said second bushing kinematically connected to the second electric motor whereby rotation of the bushing corresponds with axial translation of the threaded bar and the first bushing.

2. A portable boring-welding machine of the type used to restore the original dimensions of holes or seats on machines or machine parts to which the boring machine can be temporarily fixed, without having to transport the part to be machined to the workshop and without positioning the part on machine tools, wherein the rotation of one of a tool and torch shaft and axial movement of said shaft, in both directions, in combination with rotation of said shaft, is driven by only two independent electric motor drive units, being activated from a machine control unit, and housed in a box on the machine, having a handle for manually transporting the machine; at least the drive unit which drives the rotation of the shaft being a direct current drive unit, the electrical power supply circuit of the direct current drive unit being fitted with means which adjust its speed and operating stroke, being positioned respectively on the control unit control panel and at an end of stroke means with adjustable positioning, said stroke means being intercepted by actuator means which follows axial movement of the shaft; wherein a joint is used for the axial movement of the shaft, the joint being mounted at the rear of the machine and comprising a pair of jaws which can be clamped together about an outer sleeve of the shaft, the jaws being supported by a first bushing mounted on a tubular bar, the exterior of said bar being threaded and engaging with a second bushing, the second bushing having a threaded interior and being supported by a rear part of the machine body, the second bushing being kinematically connected, by a toothed belt, to the second drive unit in such a way that the rotation of the second bushing corresponds with an axial translation of the threaded bar and, as a result, of the first bushing to which the jaws are connected.

3. A portable boring-welding machine of the type used to restore the original dimensions of holes or seats on machines or machine parts to which the boring machine can be temporarily fixed, without having to transport the part to be machined to the workshop and without positioning the part on machine tools, wherein the rotation of one of a tool and torch shaft and axial movement of said shaft, in both directions, in combination with rotation of said shaft, is driven by only two independent electric motor drive units, being activated from a machine control unit, and housed in a box on the machine, having a handle for manually transporting the machine; at least the drive unit which drives the rotation of the shaft being a direct current drive unit, rotation means being provided for the torsional connection of the shaft to the first drive unit, for rotation, said rotation means being housed in a front part of the machine and kinematically connected to the drive unit by a toothed belt which is partially wound over a toothed pulley, the pulley keyed to an axle of the first drive unit, and partially wound around the toothed sleeve of a bushing, the shaft translating inside said bushing, being torsionally engaged with the bushing and, therefore, rotated by it; wherein a joint is used for the axial movement of the shaft, the joint being mounted at the rear of the machine and comprising a pair of jaws which can be clamped together about an outer sleeve of the shaft, the jaws being supported by a first bushing mounted on a tubular bar, the exterior of said bar being threaded and engaging with a second bushing, the second bushing having a threaded interior and being supported by a rear part of the machine body, the second bushing being kinematically connected, by a toothed belt, to the second drive unit in such a way that the rotation of the second bushing corresponds with an axial translation of the threaded bar and, as a result, of the first bushing to which the jaws are connected.

4. A portable boring-welding machine of the type used to restore the original dimensions of holes or seats of machines or machine parts to which the boring machine can be temporarily fixed, without having to transport the part to be machined to the workshop and without positioning the part on machine tools, wherein the rotation of one of a tool and torch shaft and axial movement of said shaft, in both directions, in combination with rotation of said shaft, is driven by only two independent drive units, being activated from a machine control unit, and housed in a box on the machine, having a handle for manually transporting the machine; at least the drive unit which drives the rotation of the shaft being a direct current drive unit, wherein a joint is used for the axial movement of the shaft, the joint being mounted at the rear of the machine and comprising a pair of jaws which can be clamped together about an outer sleeve of the shaft, the jaws being supported by a first bushing mounted on a tubular bar, the exterior of said bar being threaded and engaging with a second bushing, the second bushing having a threaded interior and being supported by a rear part of the machine body, the second bushing being kinematically connected, by a toothed belt, to the second drive unit in such a way that the rotation of the bushing corresponds with an axial translation of the threaded bar and, as a result, of the first bushing to which the jaws are connected.

5. The portable boring-welding machine according to claim 4, wherein the first bushing is connected to the threaded bar by means of bearings, leaving it free to rotate relative to the bar without the possibility of any relative axial movements between said threaded bar and said first bushing.

* * * * *